UNITED STATES PATENT OFFICE.

ROBERT GANS, OF GRÜNEWALD-BERLIN, GERMANY, ASSIGNOR TO PERMUTIT-AKTIENGESELLSCHAFT, OF BERLIN, GERMANY.

PROCESS OF PRODUCING ALUMINO-SILICATES.

1,121,490.  Specification of Letters Patent.  Patented Dec. 15, 1914.

No Drawing.  Application filed October 16, 1913.  Serial No. 795,581.

*To all whom it may concern:*

Be it known that I, Professor Dr. ROBERT GANS, a subject of the German Emperor, residing at Grünewald-Berlin, Germany, have invented certain new and useful Improvements in the Process of Producing Alumino-Silicates, of which the following is a specification.

It is well-known, that alumino-silicates, or rocks and minerals containing the same, are used for the purification of water. Experience has shown, that in the treatment of water, which is rich in organic matter or in organic or other acids, or of water, in which for instance free acids, such as carbonic acid, are dissolved, a portion of the bases is dissolved out of the alumino-silicates and that the alumino-silicates themselves become more or less acid. Alumino-silicates modified in this manner may be revivified or restored by treatment with alkali-metal compounds or soda solution. If water containing the above mentioned substances in large quantity acts on alumino-silicates for a considerable time, it may extract from the latter also silicic acid. In that case the alumino-silicates will readily assume a gelatinous or colloid condition, which impairs their permeability.

Experiments which were made primarily for the purpose of revivifying alumino-silicates changed in such a manner, viz: for restoring their original physical condition, have led to the result, that it is possible, generally, to convert acid alumino-silicates having a kaolin-like composition, (which include also the products of decomposition of zeolites or alumino-silicates containing water), into neutral alumino-silicates containing a normal quantity of silicic acid, by treatment with an excess of concentrated solution of an alkali-metal silicate, whereby the material assumes a granular condition, very suitable for purposes of filtration. The treatment with concentrated solution of alkali-metal silicate may take place either at ordinary temperature, or with the aid of heat, in order to accelerate the process.

In case alkaline earths are present, they may easily cause unexpected precipitations, if the material containing the same is treated with alkali-metal silicates. It is desirable, therefore, to subject the alumino-silicates first to a preliminary treatment with a warm 8-10 per cent. solution of common salt (sodium chlorid) in order to exchange the whole of the alkaline earths, that may be present in the zeolite, for alkalis.

The process described above may be used with advantage, for instance, for restoring the granular structure to alumino-silicates which have been used for filtration and which have thereby lost their original hard, granular and, (for liquids), easily permeable condition, and thereby rendering them again suitable for purposes of filtration.

What I claim is:—

1. The process of producing easily permeable granular or scaly alumino-silicates or zeolitic material from acid silicates containing alumina and having a kaolin-like composition, which consists in treating the latter with an alkali-metal silicate, substantially as described.

2. The process for the manufacture of easily permeable granular or scaly alumino-silicates or zeolitic material from acid silicates containing alumina and having a kaolin-like composition, which consists in treating the latter first with a solution of common salt and subsequently with an alkali-metal silicate, substantially as and for the purpose described.

In testimony whereof I have hereunto set my hand in presence of two subscribing witnesses.

PROFESSOR DR. ROBERT GANS.

Witnesses:
  HENRY HASPER,
  WOLDEMAR HAUPT.